US007468763B2

(12) United States Patent
Ying et al.

(10) Patent No.: US 7,468,763 B2
(45) Date of Patent: Dec. 23, 2008

(54) METHOD AND APPARATUS FOR DIGITAL MTS RECEIVER

(75) Inventors: Feng Ying, Plano, TX (US); Karl Hertzian Renner, Dallas, TX (US); Weider Peter Chang, Hurst, TX (US); Shereef Shehata, Allen, TX (US); Viet Dinh, Arlington, TX (US); Xiaodong Wu, Frisco, TX (US); Walter Heinrich Demmer, Nuremberg (DE)

(73) Assignee: Texas Instruments Incorporated, Dallas, TX (US)

( * ) Notice: Subject to any disclaimer, the term of this patent is extended or adjusted under 35 U.S.C. 154(b) by 570 days.

(21) Appl. No.: 11/199,661

(22) Filed: Aug. 9, 2005

(65) Prior Publication Data

US 2007/0035667 A1 Feb. 15, 2007

(51) Int. Cl.
*H04N 5/60* (2006.01)
*H04N 5/46* (2006.01)

(52) U.S. Cl. ........................ 348/738; 348/729; 348/485

(58) Field of Classification Search ................. 348/738, 348/729, 736, 480–485; 381/2; 455/214, 455/337; *H04N 5/44, 5/46, 5/60*
See application file for complete search history.

(56) References Cited

U.S. PATENT DOCUMENTS

| | | | | |
|---|---|---|---|---|
| 4,490,680 | A | 12/1984 | Goto | |
| 4,839,606 | A * | 6/1989 | Hallock | 329/320 |
| 5,661,433 | A * | 8/1997 | LaRosa et al. | 455/337 |
| 6,281,813 | B1 * | 8/2001 | Vierthaler et al. | 348/738 |
| 2003/0161477 | A1 | 8/2003 | Wu et al. | |

* cited by examiner

*Primary Examiner*—Sherrie Hsia
(74) *Attorney, Agent, or Firm*—Warren L. Franz; Wade J. Brady, III; Frederick J. Telecky, Jr.

(57) ABSTRACT

System and method for an all-digital audio receiver for a BTSC MTS audio signal or other composite signal that is FM modulated. A preferred embodiment comprises a digital FM demodulator for receiving an analog to digital quantized SIF signal and performing demodulation and outputting a composite audio signal, and a digital audio processor for decomposing the composite audio signal into at least the SAP, stereo and monaural signals for audio reproduction. In a preferred embodiment, the digital audio processor is a programmable digital signal processor. In a preferred embodiment, the digital FM demodulator and the digital audio processor are implemented as an integrated circuit. Methods for processing the audio signal using the digital processors of the invention are provided.

26 Claims, 3 Drawing Sheets

METHOD AND APPARATUS FOR DIGITAL MTS RECEIVER

CROSS-REFERENCE TO RELATED APPLICATIONS

This application relates to the following and commonly assigned patent application Ser. No. 11/110,032 filed Apr. 20, 2005, entitled Hardware Divider, which application is hereby incorporated herein by reference.

TECHNICAL FIELD

The present invention relates generally to a system and method for receiving and processing the audio signals for a television broadcast following the Broadcast Television Standards Committee ("BTSC") standard for composite audio sometimes referred to as Multi-Channel Television Sound ("MTS"), and more particularly to a system and method for implementing the audio receiver functions for a television broadcast receiver as a fully digital solution, which may be integrated as a single digital integrated circuit or performed in multiple integrated circuits, including Digital Signal Processors ("DSPs"). The methods and apparatus may be extended to receiving other composite and modulated broadcast signals.

BACKGROUND

Generally, in the television art, broadcast television signals include audio signals referred to as a composite audio signal following the standard known as the BTSC standard for audio signals. The audio signal is a composite signal made up of several separable channel signals that are combined into a composite signal and transmitted alongside the broadcast television video signals. The BTSC audio MTS signal was developed to support stereo audio signals for broadcast television reception and includes several individual channels. The BTSC MTS signal is transmitted at a designated carrier frequency as part of the composite broadcast television video signal, as illustrated in FIG. 1, which depicts relative signal energy plotted against the carrier modulation frequency f.

FIG. 2 illustrates the composite audio signal that includes several separate channels. In FIG. 2, the aural carrier deviation is plotted against the BTSC sub-carrier frequencies f. To support monaural or "mono" sound televisions, the first signal is the main channel "L+R", which is comparable to and useful for monaural audio signals. A television that does not support stereo sound can receive a monaural audio sound signal in this channel. For programs broadcast without stereo, this channel contains all of the audio. A pilot signal is then provided at a specified frequency fH that is typically identical with the horizontal line repetition rate of the accompanying video signal. A stereo sub-channel of "L−R" is then provided centered at frequency 2 fH. As can be understood from simple algebraic manipulations, the reception of the L+R and L−R channels provide a monaural channel and a straightforward means to recover the L and R channels separately for stereo audio reproduction, because adding the two channels results in an output of 2L, and subtracting the two channels results in an output of 2R. A channel designated the SAP channel is provided centered at a sub-carrier frequency 5 fH. The SAP channel is used to provide a Supplemental Audio Program (hence, the label "SAP") such as a second language, for example Spanish or Chinese, for a broadcast. Finally, the standard supports a so-called "professional channel" for transmitting information useful to television professionals, but typically not processed by a home television set, at a sub-carrier frequency of 6.5 fH. The incoming analog signal is usually referred to as the Sound Intermediate Frequency signal ("SIF"), which is the audio part of the television broadcast signal the receiver circuitry operates on, as shown in FIG. 1.

FIG. 3 depicts a first prior art approach to receiving and producing the left and right stereo signals from the MTS broadcast signal. In the MTS receivers of the prior art, pure analog circuits are typically used to receive, separate, demodulate and process the channels which make up the composite audio signals for the BTSC broadcast television standard signal. As illustrated in FIG. 3, the SIF signal is coupled to an analog FM demodulator circuit 101, which demodulates the signal and removes the FM carrier and outputs the composite audio signal of FIG. 2. Typically, in a BTSC system the SIF carrier frequency amounts to 4.5 MHz, although other frequencies could be used, for example for other standards. The composite audio signal is then coupled to an analog signal processing circuit 103 that separates the various audio channels of FIG. 2 from the composite signal. Circuit 103 then outputs the corresponding audio signals L and R for reproduction by the television speakers.

One disadvantage of the prior art approach is that analog signal processing uses various discrete components which are large in utilized circuit board area, may exhibit large variations with temperature or process variances, are noise sensitive, and are not compatible with highly integrated digital circuits that can provide advanced filtering and processing capabilities in very small integrated circuit devices. Complex analog components such as filters, integrated inductors, capacitors, resistors, and the like, may be required and these are known to be difficult to build accurately in an integrated form due to process variations, temperature dependent value variations, and the like, as is known by those skilled in the art. An analog receiver for FM demodulation for television audio signals using prior art analog circuitry is shown, for example, in U.S. Pat. No. 4,490,680, to Goto, issued Dec. 25, 1984, which is incorporated herein by reference.

FIG. 4 depicts another prior art approach that uses an analog FM demodulator, or front-end receiver, coupled to an analog to digital conversion circuit and then followed by a digital signal processing circuit. In FIG. 4, system 200 implements this approach. The SIF input signal is coupled to an analog FM demodulator circuit 201 which outputs an analog composite audio signal. Analog to digital converter 203 then quantizes this signal into discrete samples using conventional analog to digital converter circuitry. The digital output signal is then processed by a digital audio processor function 205, which may be implemented as a DSP integrated circuit that may be a programmable digital signal processor, or a hardware implemented digital signal processor. One example of this prior art approach is described and illustrated, for example, in U.S. Patent Application No. 2003/0161477A1, to Wu et al, published Aug. 28, 2003, which is herein incorporated by reference. Although the use of the digital signal processor in the approach described in Wu et al. offers some added performance over the purely analog receivers of the prior art, substantial analog circuitry is still required to receive and demodulate the SIF audio signal prior to the processing by the digital audio circuitry described by Wu et al.

Recent advances in the filtering and processing algorithms used with digital signal processors make it highly desirable to perform signal processing completely in digital circuitry, that is, eliminating the analog signal processing circuits of the prior art. Further, the continuing advances in integrated circuit technology, and the availability of highly advanced programmable digital signal processors as known in the art, make signal processing in the digital domain very desirable in terms of cost, speed, and performance as well as circuit area and increased signal to noise ratio performance, eliminating the need for adjustments to compensate for component tolerances, etc.

Thus, a need exists for a purely digital signal processing method and apparatus to receive, demodulate, process and reproduce the composite audio signal for a BTSC standard broadcast television signal. The preferred embodiments and methods of the invention described herein address this need.

SUMMARY OF THE INVENTION

These and other problems of the prior art are generally solved or circumvented and technical advantages are generally achieved by preferred embodiments of the present invention, which provide a method and apparatus for performing the demodulation and processing of the audio signal of a television broadcast signal, using purely digital signal processing and circuitry.

In accordance with a preferred embodiment of the present invention, a method for receiving the BTSC MTS audio signal comprises providing an analog to digital converter coupled to receive the SIF signal and convert it to a digital signal; providing an FM demodulator function which is a digital circuit and demodulates the composite audio signal from the corresponding FM modulation carrier signal; and providing a digital audio processing function which receives the composite audio signal and separates and reproduces the various MTS channels for use by a receiver. The digital audio processing circuit performs functions including bandpass filtering, decimation functions, demodulation and expansion functions to recover the L+R composite or monaural signal, the L−R or stereo channel, the SAP channel and the professional channels, and to selectively provide corresponding digital audio outputs for the receiver to use. In one preferred embodiment, the digital FM demodulator is a circuit and the digital audio processing functions are provided by a commercially available programmable DSP such as are known to those skilled in the art.

In another preferred embodiment an Application Specific Integrated Circuit ("ASIC") or a semi-custom integrated circuit may implement the FM demodulator. In another preferred embodiment, the digital FM demodulator function and the digital signal processing function may be combined into a single digital function using ASIC or semi-custom integrated circuit design technologies, and using DSP "macros" or other known techniques for the digital audio processing, to enable the integration of the two functions on a single IC. In another preferred embodiment, the FM demodulator and the digital audio function may be performed with ASIC technology in a single dedicated integrated circuit instead of using a programmable DSP function; those functions are then performed by dedicated hardware circuitry.

In accordance with another preferred embodiment of the present invention, a system for receiving and decoding the BTSC MTS audio signal comprises a receiver for receiving the SIF analog signal, an Analog to Digital Converter or ("ADC") for converting the SIF signal, a digital bandpass filter receiving the quantized SIF signal and down sampling, or decimating the quantized signal to achieve a lower sampling frequency. The digitized signal is then coupled to a splitter and a local numeric oscillator is used to develop in-phase and quadrature phase, or "I" and "Q" signals. Low pass filters implemented in typical digital signal processing form receive the I and Q signals. The I and Q signals are each then processed using differentiation and normalization circuits and combined to produce a digital composite audio signal.

The digital composite audio signal is coupled to a decimiation circuit to reduce the sampling frequency and to make the signal processing computations easier and less costly in terms of silicon area. The composite audio signal is then coupled to a digital audio processor.

Low-pass and band-pass filters are implemented using a programmable digital signal processor chip, a macro or DSP block in an ASIC, or dedicated hardware circuitry. The composite audio signal is processed by the hardware to separate the SAP channel from the remaining channels. Decimation circuitry is used to process the L+R main stereo channel and the L−R channel is separated using a high pass filter. The remaining L+R signal is then filtered using a low pass filter while the pilot signal is separated using a convolution and a digital phase locked loop, or PLL. The resulting pilot frequency is used to demodulate the amplitude modulated L−R channel which is again decimated after demodulation, and the L−R channel is then expanded. A decimation circuit followed by a fixed de-emphasis circuit operates on the main channel, and a channel selection de-multiplexer receives the three channel signals: SAP, L−R, L+R and selectively outputs monaural, SAP, or stereo L and R audio channels. A sample rate conversion or SRC circuit operates on the output of the de-multiplexer after the selection to place the signals in proper form for digital audio and, finally, the SRC circuit outputs the selected audio signals for use in producing the sound for the television system.

In another embodiment of the present invention, an existing digital FM demodulation approach is advantageously combined with the enhanced digital audio processing of the present invention to provide an all-digital circuitry audio receiver for BTSC audio signals.

An advantage of a preferred embodiment of the present invention is that the use of the digital FM demodulator, in combination with the enhanced digital audio processing function, allows the two functions to be integrated into a single digital integrated circuit or allows the use of a commercially available digital signal processor with a highly integrated FM demodulator which is highly linear and is cost effective to implement. The digital integrated circuits exhibit better performance than the analog circuits of the prior art over a wide variety of conditions and received input signal quality. The ability to integrate the functions together enable a lower cost and smaller circuit board area solution than the prior art approaches.

A further advantage of a preferred embodiment of the present invention is that the preferred digital audio function is highly optimized, uses reduced rate processing to reduce cost and complexity, and benefits from the increased performance of the digital processing block. Use of a programmable DSP allows additional functions to be easily incorporated into the circuitry in the future without the need for costly redesigns or board or system changes.

BRIEF DESCRIPTION OF THE DRAWINGS

For a more complete understanding of the present invention and the advantages thereof, reference is now made to the following description taken in conjunction with the accompanying drawing, in which.

The drawings and illustrations are not to scale, are presented as representative and for enhancing the reader's comprehension of the preferred embodiments, are not limiting, and are exemplary preferred embodiments but are not the only embodiments contemplated as part of the invention and covered by the appended claims.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention and do not limit the scope of the invention.

The present invention will be described with respect to preferred embodiments in a specific context, namely an all-digital receiver for BTSC MTS audio signals for broadcast television reception. The invention may also be advantageously applied to other receivers for FM modulated composite signals.

Figure 5:
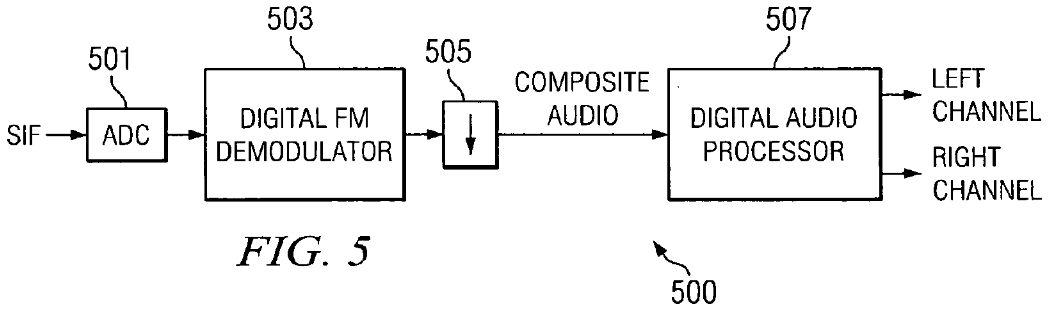
FIG. 5 is a block diagram of a preferred embodiment of a BTSC decoding circuit of the invention.

With reference now to FIG. 5, there is shown a block diagram of a system 500 which illustrates a preferred embodiment of the apparatus of the invention. The various blocks of system 500 may be implemented as one, two or several integrated circuits, and may include existing commercial integrated circuits for the digital audio processing block and the analog to digital converter, for example.

In system 500, the incoming audio signal SIF is coupled to an analog to digital converter 501 which may be, for example, a pipelined analog to digital converter or other ADC circuit as is known in the art. The sampling rate and the number of bits of resolution may vary but it is typically an advantage to use a low bit count ADC with a fast sampling rate, for ease of computation and implementation.

The quantized signal is now output from the ADC and input to a digital FM demodulator 503. This circuitry may be implemented in an integrated circuit such as an ASIC or gate array or semi-custom integrated circuit or otherwise as discrete components. The details of the operation of this circuit will be provided below but the circuit receives the quantized SIF signal from the ADC and outputs a digital form of the composite audio signal, removing the FM modulation carrier by a process of demodulation as is described further below.

Decimator 505 then decimates the composite audio signal. This decimation function downsamples the quantized signal, that is, the number of samples per time interval is reduced and, thus, the frequency of arriving samples is reduced to enhance the efficiency of the filtering and processing steps to follow by reducing the rate at which the various computations have to be performed between samples.

The digital composite audio signal is then input to digital audio processing circuit 507. As will be further described, the digital audio processing circuit 507 will separate the various signals in the composite audio digital signal into the channels of FIG. 2, the L+R channel, the pilot channel, the L−R channel, the SAP channel, and (optionally, not always used in the preferred embodiments) the professional channel, and the various separated channels will be coupled to a channel selector de-multiplexer which will select which channel is output on the L and R channel outputs from the digital audio processor 507. As will be further described, this circuitry may be implemented as software executing on a commercially available programmable DSP, or may be implemented on the same ASIC or custom integrated circuit as the FM demodulator circuit, for example, using a DSP "macro" function as is known in the art. In another preferred embodiment, the functions of the digital audio processor may be implemented as a dedicated digital hardware circuit. This approach may provide the highest circuit performance although this last embodiment may also carry a higher cost of design and/or manufacture.

Figure 6:
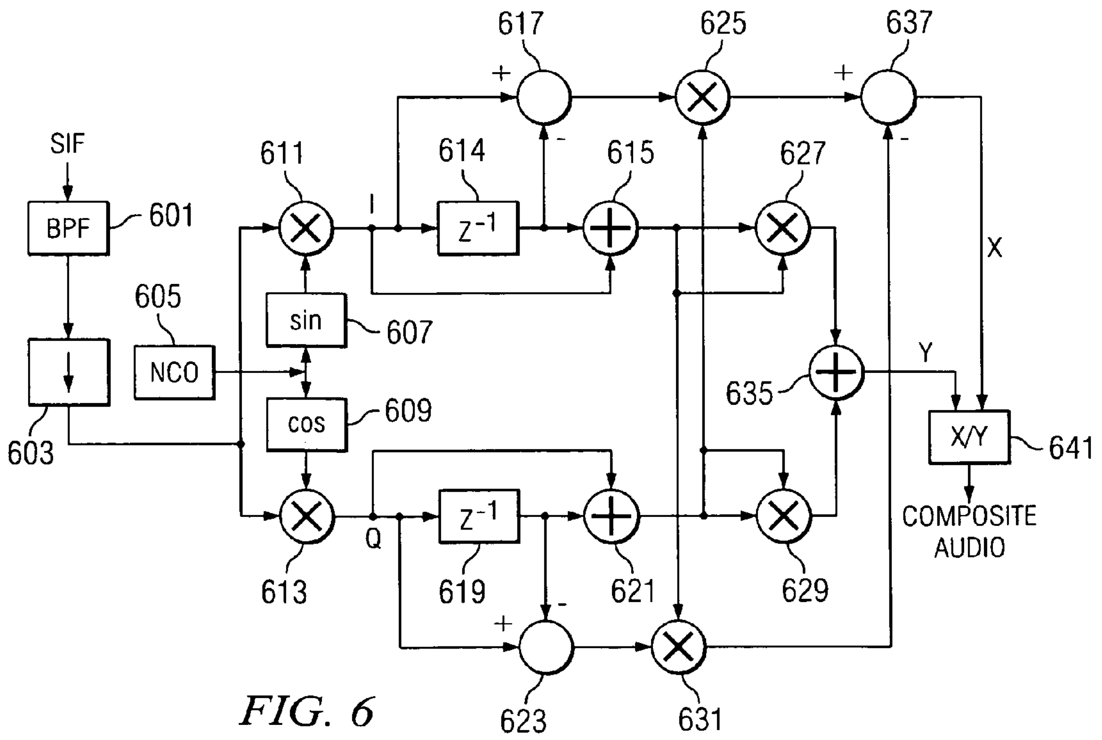
FIG. 6 is a circuit diagram illustrating a preferred embodiment of the functional blocks of the digital FM demodulator circuitry of the invention.

FIG. 6 depicts in a block diagram form the functions performed by the digital FM demodulator 503 in FIG. 5.

In FIG. 6, the quantized SIF signal output by the analog to digital converter is input to a digital bandpass filter 601. This bandpass filter will remove quantization noise and aliasing that occurs during the analog to digital conversion as is known in the art. The signal is then decimated, or downsampled, by decimator 603. This function reduces the number of samples and, therefore, enhances the processing of subsequent functional blocks by reducing the frequency of operations necessary in subsequent stages.

Numeric controlled oscillator 605 is used to drive sine waveform generator 607 and cosine waveform generator 609 which generate the sine and cosine waveforms used in the in-phase and quadrature-phase component extraction operations to follow.

Multiplier 611 impresses the sine waveform onto the incoming signal and outputs the in-phase, or "I" component signal. Multiplier 613 likewise impresses the cosine waveform onto the incoming signal and outputs the quadrature-phase, or "Q" component signal.

A transform function is applied to both the I and Q signals to further perform the digital FM demodulation. Delay element 614 is used with adder 615 and differentiator 617 to generate two sums, $I+Z^{-1}(I)$ and $I-Z^{-1}(I)$. The differentiator 617 is used to approximate the derivative of signal I with respect to time. The adder 615 serves as a low-pass filter whose delay matches with the differentiator 617. Similarly, a symmetric transfer function is applied to the Q signals to generate two sums, Q and $Z^{-1}(Q)$ are combined to form $Q+Z^{-1}(Q)$ and $Q-Z^{-1}(Q)$.

Processing continues by combining these four sums into four product terms, multiplier 625 combines $Q+Z^{-1}(Q)$ with $I-Z^{-1}(I)$, symmetrical multiplier 631 combines $I+Z^{-1}(I)$ with $Q-Z^{-1}(Q)$, and multiplier 627 squares terms $I+Z^{-1}(I)$. Finally, symmetrical multiplier 629 squares $Q+Z^{-1}(Q)$.

These four product terms are then combined. Adder 635 sums the inner squared products, and adder 637 subtracts the outer products. Signal Y is then the sum of the terms $(I+Z^{-1}(I))^2$ and $(Q+Z^{-1}(Q))^2$, while signal X is the difference $(Q+Z^{-1}(Q))*(I-Z^{-1}(I))-(I+Z^{-1}(I))*(Q-Z^{-1}(Q))$.

Finally, a ratio is taken by divider 641 which divides signal X by signal Y and outputs the digital composite audio signal, the discrete components due to the FM modulation carrier signal having thus been removed. An FM digital demodulator using a look-up table divider to perform this division is described by co-pending U.S. patent application Ser. No. 11/110,032, filed Apr. 20, 2005, ("Hardware Divider"), which is incorporated above. In this approach, the digital divider block first estimates the reciprocal of an input signal (denominator) by use of a look-up table, the first estimate is then quickly improved by an approximation algorithm which provides an improved estimate of the reciprocal in a single iteration, and then the reciprocal is multiplied by the numerator, thus, performing the division. The digital divider thus implemented is rapid enough to allow real-time calculation of the division as is required by the processing requirements for this application.

Figure 1:
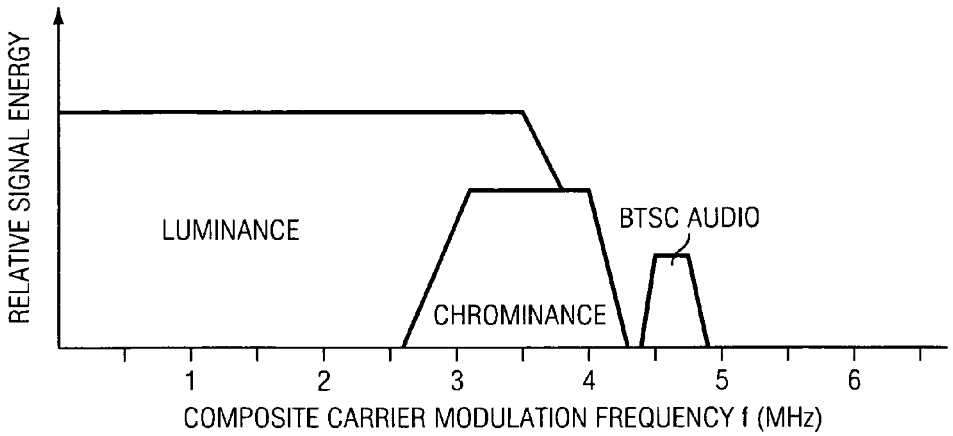
FIG. 1 illustrates a typical composite video signal including the SIF or sound intermediate frequency signal to be received.
Figure 7:
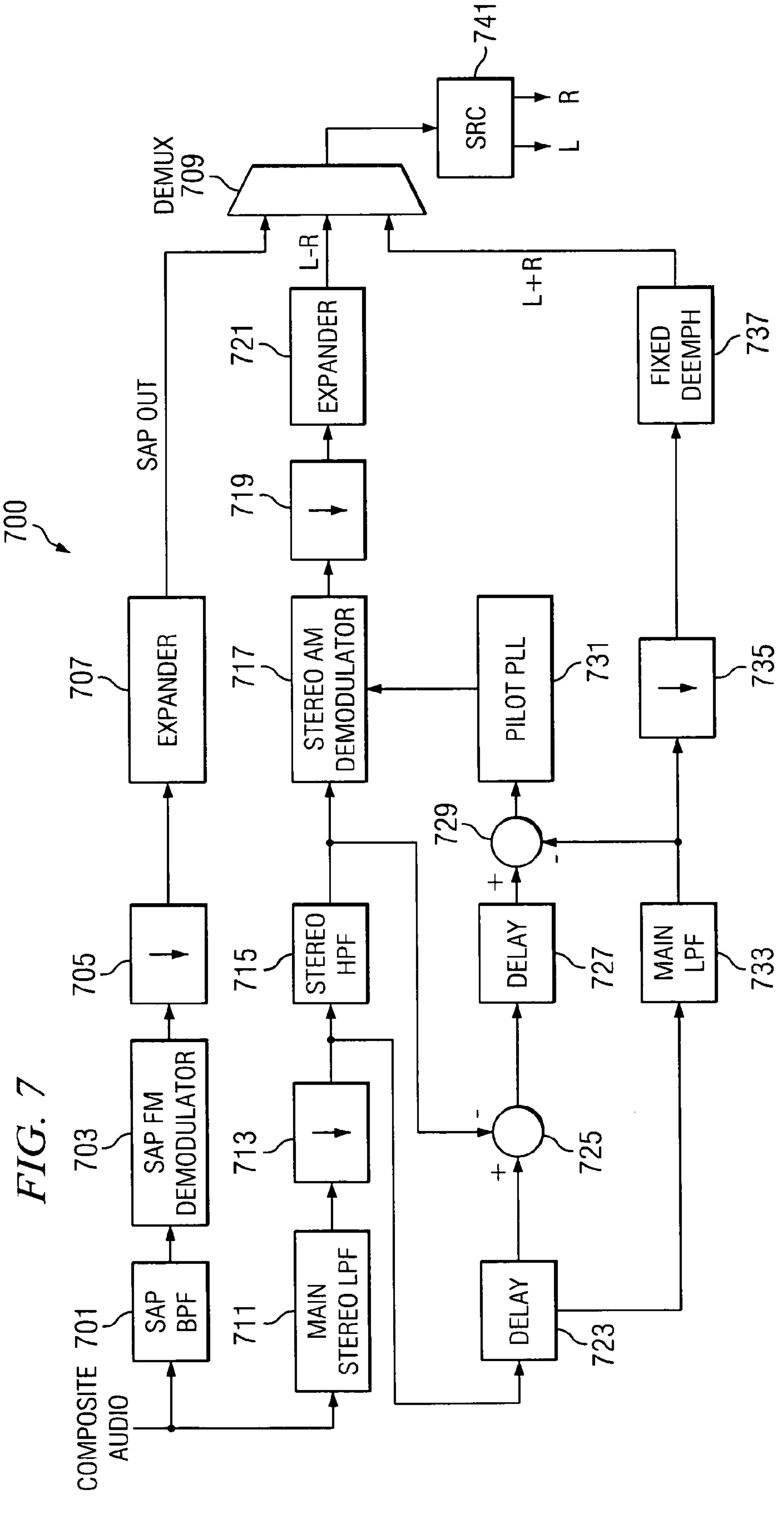
FIG. 7 is a circuit diagram illustrating a preferred embodiment of the functional blocks of the digital audio receiver circuitry of the invention.

FIG. 7 then depicts an implementation of the remaining functions, the digital audio processor 507 of FIG. 5. This audio processing circuit will operate to separate by bandpass filtering and to demodulate (if required) each of the channels for the SAP, stereo or L−R and the monaural or L+R signals from the digital composite audio signal. Optionally, the circuit may also decompose a professional channel from the composite signal as described with respect to the depiction of the composite signal channels in FIG. 1.

In circuit 700, which may be implemented as a dedicated hardware circuit, or as functions implemented as programming steps in software executing on a programmable DSP or a combination of these two approaches, a preferred implementation of digital audio processing circuit 507 of FIG. 5 is depicted. The composite audio signal received from the FM demodulator in FIG. 6 is input to bandpass filter 701, which separates the SAP portion of the signal. Once the SAP portion of the signal is obtained, the SAP FM Demodulator 703 performs a typical FM demodulation step to remove the modulation carrier signal from the signal. Decimator 705 downsamples the signal and expander 707 then adjusts the signal based on its frequency spectrum to compensate for frequency components compressed prior to transmission. The output of expander 707 is then input to de-multiplexer 709 which will selectively choose one of several signal sources for the audio output; one choice is the SAP signal.

Figure 2:
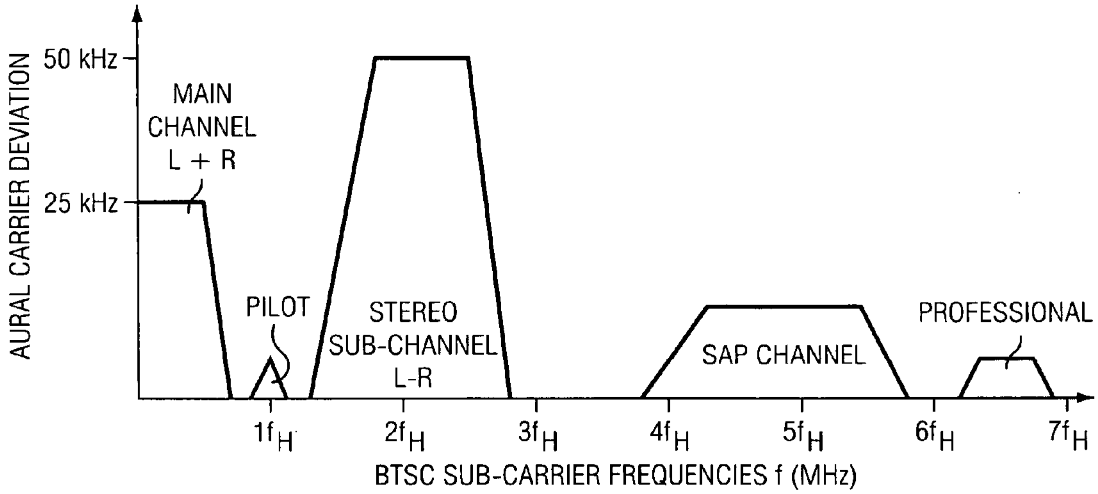
FIG. 2 illustrates the various channels contained within the composite audio signal.
Figure 3:
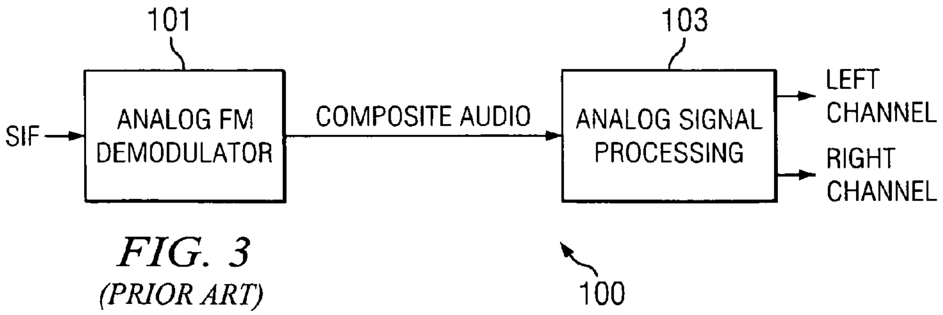
FIG. 3 (PRIOR ART)
FIG. 3 is a block diagram of a prior art analog BTSC decoding circuit using analog circuitry.
Figure 4:
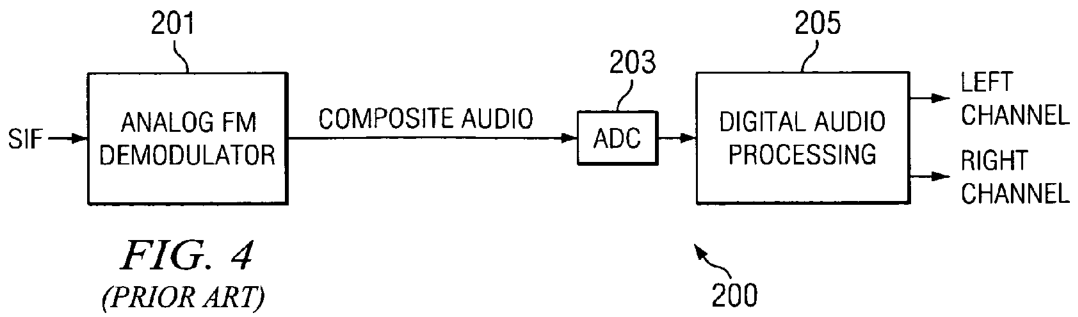
FIG. 4 (PRIOR ART)
FIG. 4 is a block diagram of a prior art BTSC decoding circuit using an analog FM demodulator circuit combined with a digital composite audio circuit.

The main stereo signal is also isolated from the composite audio input signal; this signal is located in the lower part of the frequency spectrum of the composite audio signal as seen in FIG. 2 and is isolated from the SAP and professional channels by use of a simple low pass filter 711. Downsampler 713 is used to decimate the signal. The L−R signal, or the stereo signal, is then separated from the main stereo signal by the high pass filter 715. This signal is transmitted as an AM modulated signal and is demodulated in a typical demodulation step at stereo AM demodulator 717, then again downsampled by decimator 719. Again, expander 721 is used to compensate for frequency components compressed prior to transmission.

The delay element 723 is used to derive a delayed version of the main stereo signal which includes the L+R and L−R signals, to differentiator 725 with the delay matched to the high pass filter 715. Differentiator 725 subtracts the stereo L−R signal from the main signal which includes the pilot signal and the L+R signal. Main low pass filter 733 simultaneously receives the delayed signal and using another low pass filter, isolates the L+R signal which lies at the lowest part of the frequency spectrum of the composite audio signal, as seen in FIG. 2. Delay element 727 matches the delay in the main low pass filter 733 so that the input to differentiator 729 is the signal comprising the pilot channel plus the main L+R on the positive input and the main L+R on the subtraction input; the resulting output is the now isolated pilot channel. The pilot signal drives the phase locked loop circuit 731 that outputs a signal used to demodulate the AM carrier from the stereo L−R signal, which feeds a decimator 719 as described above.

Finally the main L+R signal is also downsampled by decimator 735 which feeds the de-emphasis circuit 737 as is known in the art, and the output of the de-emphasis circuit is the L+R signal input into the de-multiplexer 709.

As depicted in FIG. 7, the de-multiplexer 709 receives three input signals which may be used as an audio source: the SAP channel, the L−R channel, and the L+R channel. While not shown, it is known that the L+R and L−R channels can be used to generate the L and R stereo signals by performing a simple algebraic manipulation of the two signals. The de-multiplexer outputs the selected source signals to the sample rate converter 741 which will convert the signal to one of the three defined signal rates: 48, 44.1 or 32 kHz.

Finally the L and R signals (identical for the monaural TV set, though none are presently produced) are output to the system for use in producing the audio sound. In addition, the digital audio processor may output a professional channel output, which may be decomposed from the composite audio signal in another preferred embodiment of the invention.

Although the present invention and its advantages have been described in detail, it should be understood that various changes, substitutions and alterations can be made herein without departing from the spirit and scope of the invention as defined by the appended claims. For example, many of the features and functions discussed above can be implemented in software, hardware, or firmware, or a combination thereof. As another example, it will be readily understood by those skilled in the art that the various frequencies and the down-sampling and expanding steps may be varied while remaining within the scope of the present invention.

Moreover, the scope of the present application is not intended to be limited to the particular embodiments of the process, machine, manufacture, composition of matter, means, methods, and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein, may be utilized according to the present invention. Accordingly, the appended claims are intended to include within their scope such processes, machines, manufacture, compositions of matter, means, methods, or steps.

What is claimed is:

1. An all-digital receiver for multi-channel television sound signals, comprising:

- an input for receiving a television sound intermediate frequency (SIF) signal;
- an analog to digital converter coupled for converting the SIF signal to a quantized, digital signal;
- a digital FM demodulator for receiving the quantized digital signal and for outputting a demodulated composite audio signal; said digital FM demodulator comprising an oscillator for impressing a sine and cosine reference onto the digital signal and for producing corresponding in-phase and quadrature-phase component signals, and
- a digital divider circuit; and
- a digital audio processor for receiving the demodulated composite audio signal and for selectively outputting at least one signal from the group of the L+R, stereo, and SAP signals contained within the composite audio signal.

2. The receiver of claim 1, wherein said digital divider uses a look-up table to estimate a reciprocal.

3. The receiver of claim 1, wherein the digital FM demodulator and the digital audio processor are implemented as a single integrated circuit.

4. The receiver of claim 3, wherein the digital audio processor is a programmable digital signal processor macrocell.

5. An all-digital receiver for multi-channel television sound signals, comprising:

an input for receiving a television sound intermediate frequency (SIF) signal an analog to digital converter coupled for converting the SIF signal to a quantized, digital signal;

a digital FM demodulator for receiving the quantized digital signal and for outputting a demodulated composite audio signal; and a digital audio processor for receiving the demodulated composite audio signal and for selectively outputting at least one signal from the group of the L+R, stereo, and SAP signals contained within the composite audio signal; the digital audio processor comprising:

an SAP processor which isolates the SAP signal from the composite audio signal and outputs the isolated SAP signal;

a stereo signal processor which isolates the L−R signal from the composite audio signal and outputs the isolated L−R signal;

a main audio processor which isolates the L+R signal from the composite audio signal and outputs the isolated L+R signal;

a left channel processor which receives the L+R and L−R signals and outputs a left channel signal;

a right channel processor which receives the L+R and L−R signal and outputs a right channel signal; and a de-multiplexer which selectively outputs a left and right channel signals selected from the SAP, L+R and left and right stereo signals.

6. The digital audio processor of claim 5, wherein the digital audio processor further comprises a digital signal processor executing software.

7. The digital audio processor of claim 6, wherein the digital audio processor further comprises digital circuitry for receiving the composite audio signal, and for processing the signal and selectively outputting left and right channel signals which are selected from the group of the SAP signal, the L+R signal, and stereo left and right channel signals produced from the L−R and L+R signals of the composite audio signal.

8. The receiver of claim 7, wherein the digital circuitry is further for decomposing a professional channel signal from the composite audio signal and producing a corresponding output signal.

9. An integrated circuit for providing an all-digital audio receiver for a broadcast television stereo signal, comprising:

an input for receiving a television sound intermediate frequency signal;

an analog to digital converter for converting the sound intermediate frequency signal to a quantized, digital signal;

a digital FM demodulator for receiving the quantized digital signal and for outputting a demodulated composite audio signal; and a digital audio processor for receiving the demodulated composite audio signal and for selectively outputting at least one signal from the group of the L+R, stereo and SAP signals contained within the composite audio signal; the digital audio processor being a programmable digital signal processor macrocell.

10. The receiver of claim 9, wherein said digital FM demodulator is a quadrature demodulator.

11. The receiver of claim 9, wherein said digital FM demodulator further comprises an oscillator for impressing a sine and cosine reference onto the digital signal and for producing corresponding in-phase and quadrature-phase component signals.

12. An integrated circuit for providing an all-digital audio receiver for a broadcast television stereo signal, comprising:

an input for receiving a television sound intermediate frequency signal;

an analog to digital converter for converting the sound intermediate frequency signal to a quantized, digital signal;

a digital FM demodulator for receiving the quantized digital signal and for outputting a demodulated composite audio signal; and a digital audio processor for receiving the demodulated composite audio signal and for selectively outputting at least one signal from the group of the L+R, stereo and SAP signals contained within the composite audio signal; the digital audio processor comprising:

an SAP processor which isolates the SAP signal from the composite audio signal and outputs the isolated SAP signal;

a stereo signal processor which isolates the L−R signal from the composite audio signal and outputs the isolated L−R signal;

a main audio processor which isolates the L+R signal from the composite audio signal and outputs the isolated L+R signal;

a left channel processor which receives the L+R and L−R signals and outputs a left channel signal;

a right channel processor which receives the L+R and L−R signal and outputs a right channel signal; and a de-multiplexer which selectively outputs a left and right channel signals selected from the SAP, L+R, and left and right stereo signals.

13. The integrated circuit of claim 12, wherein the digital FM demodulator includes a digital divider circuit.

14. The integrated circuit of claim 13, wherein the digital divider circuit further includes circuitry to implement a look-up table for estimating a reciprocal.

15. An all-digital method of decoding the audio portions of a broadcast television signal, comprising the steps of:

receiving an analog audio signal at an intermediate frequency;

converting the analog audio signal to a quantized digital audio signal;

performing a digital FM demodulation on the quantized digital audio signal;

outputting a composite audio signal that contains an SAP signal, a stereo signal and a monaural signal;

decomposing the composite audio signal into a separate signal that is the SAP signal;

decomposing the composite audio signal into a separate signal that is the stereo signal;

decomposing the composite audio signal into a separate signal that is the monaural signal; and selectively outputting one of the SAP, stereo and monaural signals.

16. The method of claim 15, wherein the steps of performing a digital FM demodulation further comprise the steps of:

bandpass filtering the downsampled signal;

downsampling the quantized digital audio signal;

extracting the in-phase and quadrature components of the audio signal;

differentiating the phase components of the audio signal;
calculating an instantaneous derivative of each of the in phase and quadrature components;
combining the components to form a demodulated phase signal; and
dividing the demodulated phase signal by a normalized signal.

17. The method of claim 16, wherein the steps of selectively outputting one of the SAP, the stereo and the monaural signals further comprise:
inputting the SAP, the stereo and the monaural signals to a de-multiplexer; and
performing a source rate conversion to convert the source rate of the signal to standard source rate.

18. The method of claim 15 wherein, the steps of selectively outputting one of the SAP, the stereo and the monaural signals further comprise:
inputting the SAP, the stereo and the monaural signals to a de-multiplexer; and
performing a source rate conversion to convert the source rate of the signal to standard source rate.

19. The method of claim 15, further comprising decomposing a professional channel signal from the composite audio signal and producing a corresponding output signal.

20. An all-digital receiver for multi-channel television sound signals, comprising:
an input for receiving a television sound intermediate frequency (SIF) signal;
an analog to digital converter coupled for converting the SIF signal to a quantized, digital signal;
a digital FM demodulator for receiving the quantized digital signal and for outputting a demodulated composite audio signal, the digital FM demodulator further comprising a digital divider circuit; and
a digital audio processor for receiving the demodulated composite audio signal and for selectively outputting at least one signal from the group of the L+R, stereo, and SAP signals contained within the composite audio signal.

21. The receiver of claim 20, wherein said digital divider uses a look-up table to estimate a reciprocal.

22. The receiver of claim 20, wherein the digital audio processor is a programmable digital signal processor macrocell.

23. An all-digital receiver for multi-channel television sound signals, comprising:
an input for receiving a television sound intermediate frequency (SIF) signal;
an analog to digital converter coupled for converting the SIF signal to a quantized, digital signal;
a digital FM demodulator for receiving the quantized digital signal and for outputting a demodulated composite audio signal; and
a digital audio processor for receiving the demodulated composite audio signal and for selectively outputting at least one signal from the group of the L+R, stereo, and SAP signals contained within the composite audio signal; the digital audio processor being a programmable digital signal processor macrocell.

24. An integrated circuit for providing an all-digital audio receiver for a broadcast television stereo signal, comprising:
an input for receiving a television sound intermediate frequency signal;
an analog to digital converter for converting the sound intermediate frequency signal to a quantized, digital signal;
a digital FM demodulator for receiving the quantized digital signal and for outputting a demodulated composite audio signal, the digital FM demodulator including a digital divider circuit; and
a digital audio processor for receiving the demodulated composite audio signal and for selectively outputting at least one signal from the group of the L+R, stereo and SAP signals contained within the composite audio signal.

25. The integrated circuit of claim 24, wherein the digital divider circuit further includes circuitry to implement a look-up table for estimating a reciprocal.

26. The integrated circuit of claim 25, wherein the digital audio processor further comprises:
an SAP processor which isolates the SAP signal from the composite audio signal and outputs the isolated SAP signal;
a stereo signal processor which isolates the L−R signal from the composite audio signal and outputs the isolated L−R signal;
a main audio processor which isolates the L+R signal from the composite audio signal and outputs the isolated L+R signal;
a left channel processor which receives the L+R and L−R signals and outputs a left channel signal;
a right channel processor which receives the L+R and L−R signal and outputs a right channel signal; and
a de-multiplexer which selectively outputs a left and right channel signals selected from the SAP, L+R, and left and right stereo signals.

* * * * *